United States Patent [19]

Nakayama et al.

[11] 4,073,758

[45] Feb. 14, 1978

[54] EMULSION COMPOSITIONS

[75] Inventors: Yasuharu Nakayama; Tadashi Watanabe; Yoshio Yamashita; Tetsuo Aihara; Isao Toyomoto, all of Hiratsuka, Japan

[73] Assignee: Kansai Paint Company, Limited, Amagasaki, Japan

[21] Appl. No.: 718,767

[22] Filed: Aug. 30, 1976

[30] Foreign Application Priority Data

Sept. 12, 1975 Japan .................................. 50-111225

[51] Int. Cl.$^2$ .............................................. C08L 63/10
[52] U.S. Cl. ........................... 260/23 EP; 260/18 EP; 260/23 EM; 260/23.7 A; 260/29.6 RW
[58] Field of Search ........ 260/23 EM, 23.7 A, 23 EP, 260/29.6 RW, 18 EP

[56] References Cited

U.S. PATENT DOCUMENTS

| | | | |
|---|---|---|---|
| 3,251,790 | 5/1966 | Christenson et al. | 260/23.7 A |
| 3,293,201 | 12/1966 | Shahade et al. | 260/23 EP |
| 3,835,076 | 9/1974 | Jeffery et al. | 260/23 EP |
| 3,951,892 | 4/1976 | Drury, Jr. et al. | 260/23 EM |
| 3,993,612 | 11/1976 | Aiharo et al. | 260/29.6 RW |

*Primary Examiner*—Eugene C. Rzucidlo
*Attorney, Agent, or Firm*—Larson, Taylor and Hinds

[57] ABSTRACT

An emulsion composition prepared by the emulsion polymerization of a polymerizable vinyl monomer in the presence of an emulsifier characterized in that the emusifier is a neutralized maleate, partial maleate, fumarate or partial fumarate of an addition polymerization polymer having as a side chain a drying oil fatty acid residue and/or semi-drying oil fatty acid residue linked to the main chain of the polymer by an ester bond.

17 Claims, No Drawings

EMULSION COMPOSITIONS

This invention relates to emulsion compositions which are hardenable by oxidation, and more particularly to emulsion compositions to be hardened by oxidation which are obtained by the emulsion polymerization of a polymerizable vinyl monomer using as an emulsifier high-molecular-weight resin hardenable by oxidation.

Various attempts have heretofore been made to obtain emulsions hardenable by oxidation using high-molecular-weight resin hardenable by oxidation as an emulsifier for emulsion polymerization. For example emulsions are known which are prepared with use of maleinized polybutadiene, maleinized oil or maleinized alkyd resin as an emulsifier. However, such emulsions have the following drawbacks. The emulsion prepared with use of maleinized 1,4-polybutadiene as an emulsifier has poor weather resistance and is prone to degradation by ultraviolet rays because the emulsifier contains too many double bonds. The emulsion obtained with use of maleinized 1,2-polybutadiene as an emulsifier has great cross-linking properties, so that the polymer constituting the emulsion particles are in the form of high polymer molecules. Accordingly coating compositions prepared from such emulsion are not amenable to coating operations. Said emulsion is not always satisfactory in weather resistance because the emulsifier contains some double bonds. Further when preparing an emulsion with use of maleinized oil or maleinized alkyd resin as an emulsifier, the polymerizable vinyl monomer to be subjected to emulsion polymerization is not fully compatible with the emulsifier and the polymerization system contains the polymerizable vinyl monomer and unsaturated bonds of the chain termination type (derived from drying oil fatty acid or semi-drying oil fatty acid) in a random mixture, with the result that the emulsion is not readily available. It is therefore difficult to obtain an emulsion composed of fine particles and hardenable by oxidation.

An object of this invention is to provide an excellent emulsion composition to be hardened by oxidation and free of the foregoing drawbacks of the emulsions heretofore known.

Another object of this invention is to provide an emulsion composition prepared by the emulsion polymerization of a polymerizable vinyl monomer with use of an emulsifier which is compatible with the monomer, the emulsion being readily formable, composed of fine particles and satisfactorily hardenable by oxidation.

Another object of this invention is to provide an emulsion composition in which the polymer constituting the particles of the emulsion is not in the form of high polymer particles and which is therefore highly amenable to coating operation.

Another object of this invention is to provide an emulsion composition which is comparable to those theretofore available in giving coatings having excellent resistance to water and corrosion, high adhesiveness and especially outstanding weather resistance.

Other objects and features of this invention will become apparent from the following description.

This invention provides an emulsion composition prepared by the emulsion polymerization of a polymerizable vinyl monomer in the presence of an emulsifier characterized in that the emulsifier is a neutralized maleate, partial maleate, fumarate or partial fumarate of an addition polymerization polymer having as a side chain a drying oil fatty acid residue and/or semi-drying oil fatty acid residue linked to the main chain of the polymer by an ester bond.

The emulsifiers useful in this invention have a number average molecular weight variable over a wide range, preferably from about 500 to about 25,000, more preferably from about 800 to about 10,000 as determined by gel permeation chromatography. They have an appropriate structure for use as emulsifiers for the emulsion polymerization of polymerizable vinyl monomers. More specifically the emulsifiers of this invention comprises an addition polymerization polymer as the main chain and a maleinized or fumarized drying or semi-drying oil fatty acid residue as a side chain, the main chain and the side chain being linked together by an ester bond between the hydroxyl or epoxy on the main chain and the carboxyl on the side chain. The main chain has affinity for oil, while the side chain can be hydrophilic by neutralization with a base. When a polymerizable vinyl monomer is added to an aqueous solution of the emulsifier and the mixture stirred, a satisfactory emulsion is obtained since the vinyl monomer is highly compatible with the addition polymerization polymer portion of the emulsifier which closely resembles the monomer in structure and the water-soluble carboxyl group is present on the side chain. The polymerizable vinyl monomer is positioned within the interior of the emulsion particles, while the drying oil or semi-drying oil fatty acid portion is positioned in the outer shells of the emulsion particles. Consequently, the double bonds of the chain transfer type contained in the drying oil or semi-drying oil fatty acid in the outer shells are less likely to interfere with the emulsion polymerization. On the other hand, the point of activation for oxidation hardening on the outer shell is also less likely to be damaged by radical polymerization. Further unlike the case wherein maleinized polybutadiene is used, the emulsion contains less carbon-carbon double bonds (but is higher in activity) and has outstanding resistance to weather. As compared with the case in which 1,2-vinyl type polybutadiene is used, the polymer constituting the emulsion is rendered suitably lower-molecular-weight, so that the emulsion is satisfactorily usable for coating operation and rapidly undergoes cross linking after application, giving coatings of improved properties and higher weather resistance.

The addition polymerization polymers having a drying oil fatty acid residue and/or semi-drying oil fatty acid residue on the side chain are prepared for example by the following methods. A homopolymer of hydroxyl- or glycidyl-containing vinyl monomer or a copolymer thereof with a vinyl monomer (A) not containing glycidyl and hydroxyl is esterified with drying oil fatty acid and/or semi-drying oil fatty acid. When the copolymer is used, the copolymer must contain at least 5% by weight of the hydroxyl- or glycidyl-containing vinyl monomer component. According to another method, drying oil fatty acid and/or semi-drying oil fatty acid is added to glycidyl methacrylate or glycidyl acrylate to obtain a monomer, from which a homopolymer thereof is prepared or which is copolymerized with the vinyl monomer (A). When the copolymer is prepared, the copolymer needs to contain at least 5%, preferably at least 10% by weight of the addition monomer component.

Exemplary of the hydroxyl- or glycidyl-containing vinyl monomer are allyl alcohol, eaters represented by the formula $CH_2=C(R_1)COOR_2$ wherein $R_1$ is hydrogen or $CH_3$, and $R_2$ is $-CH_2CH_2OH$, $-CH_2CH_2CH_2OH$, $-CH_2CH(OH)CH_3$,

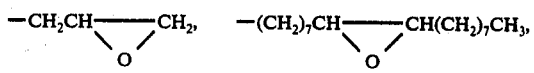

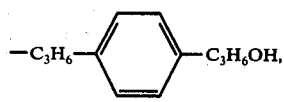

$-(CH_2CH_2O)_nH$ or $-(C_3H_6O)nH$, $n$ being an integer of 2 to 6. These monomers are usable singly, or at least two of them are used conjointly. Among these, allyl alcohol is suitable to use for giving a polymer having a high OH value and for preparing an emulsifier having a long oil length. It readily permits emulsion polymerization and is therefore very advantageous to this invention.

Exemplary of the vinyl monomer (A) are styrene, vinyltoluene, α-methylstyrene, acrylonitrile, methacrylonitrile, esters represented by the formula $CH_2 = C(R_3)COOR_4$ wherein $R_3$ is hydrogen or $CH_3$, $R_4$ is alkyl having one to 26 carbon atoms, $(CH_2CH_2O)_nR_5$ or

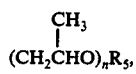

$R_5$ is alkyl having one to 8 carbon atoms, and $n$ is an integer of 1 to 6, etc. It is preferable to use monomers which are highly copolymerizable with the hydroxyl- or glycidyl-containing vinyl monomer, glycidyl methacrylate-added fatty acid monomer and glycidyl acrylate-added fatty acid monomer, giving polymers which are stable at high temperatures. Also useful are monomers which are generally used for radical polymerization such as compounds represented by the formula $CH_2=CHR_6$ wherein $R_6$ is $OCOCH_3$ or Cl and VeoVa monomers (trade mark of vinyl ester of synthetic tertiary carboxylic acid, Product of Shell Chemical Co., U.S.A., general formula:

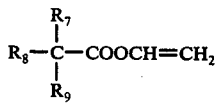

wherein $R_7$, $R_8$ and $R_9$ are alkyl and at least one of them is $CH_3$.) These vinyl monomers (A) are usable singly or at least two of them are used conjointly.

Examples of the drying oil fatty acids and semi-drying oil fatty acids useful in this invention are safflower oil fatty acid, soybean oil fatty acid, linseed oil fatty acid, hemp seed oil fatty acid, poppy seed oil fatty acid, sunflower oil fatty acid, walnut oil fatty acid, etc, which contain many nonconjugated double bonds and are amenable to maleinization or fumarinization and polymerization without undergoing gelation and readily hardenable. Also usable are corn oil fatty acid, cotton seed oil fatty acid, mustard oil fatty acid, oiticica oil fatty acid, peanut oil fatty acid, perilla oil fatty acid, rubber-seed oil fatty acid, sesame oil fatty acid, tall oil fatty acid, tung oil fatty acid, dehydrated castor oil fatty acid, etc.

The emulsifier of this invention is prepared by introducing the drying oil fatty acid and/or semi-drying oil fatty acid into the main chain of the addition polymerization polymer by esterification reaction, maleinizing, partially maleinizing, fumarinizing or partially fumarinizing the resulting product and thereafter neutralizing the maleinized or fumarinized product. The esterification reaction may be conducted by known methods. For example, the addition polymerization polymer and fatty acid are reacted at about 100° to 250° C in an esterifying solvent. The proportion of the fatty acid in the addition polymerization polymer may vary over a wide range and is usually about 10 to 90% by weight.

The maleinization, partial maleinization, fumarinization or partial fumarinization may be conducted in a usual manner, i.e. by reacting maleic acid, maleic anhydride or fumaric acid and the addition polymerization polymer at about 120° to 250° C. When the polymer contains many hydroxyl groups, it is preferable to esterify the polymer with acetic acid, propionic acid, stearic acid or like low- or high-molecular weight acid to remove the excess hydroxyl groups and to subsequently conduct maleinization or fumarinization. If excess hydroxyl groups are present, the hydroxyl groups react with maleic acid or fumaric acid, and the desired emulsifier of this invention is not available. When the polymer is maleinized with maleic anhydride, the acid anhydride group must be subjected to ring cleavage with use of water, alcohol, ammonia, amine or the like. In this case the maleinized, partially maleinized, fumarinized or partially fumarinized product may preferably have a final acid value of about 20 to about 350, more preferably about 50 to about 150, prior to neutralization. When the maleinization or fumarinization is effected with use of maleic acid or fumaric acid, it is preferable to adjust the amount of maleic acid or fumaric acid so that the product may also have an acid value of the above range prior to neutralization. With the acid value in the above-mentioned range of about 20 to about 350, the maleinized, partially maleinised, fumarinized or partially fumarinized product has good water-solubility and good water-dispersibility, giving coatings of high water resistance. The neutralization is carried out by known methods; e.g. by stirring the maleinized or fumarinized product with ammonia, amine, alkali metal compound or the like.

The emulsion compositions of this invention can be obtained by subjecting a polymerizable vinyl monomer to emulsion polymerization with use of the emulsifier prepared in the foregoing manner.

A wide variety of polymerizable vinyl monomers are useful in this invention. As is the case with usual emulsion polymerization, however, it is not preferable to use a large quantity of hydrophilic vinyl monomers. In the present invention, it is preferable to use vinyl monomers free from too active radicals. When vinyl monomers which produce too active radicals are used, the vinyl monomers sometimes react with drying oil fatty acid and/or semi-drying oil fatty acid to thereby reduce the amount of polymer to be obtained and to impair the hardening property of the resulting emulsion. Examples of useful polymerizable vinyl monomers are:

Esters represented by the formula $CH_2=C(R_{10})COOR_{11}$ wherein $R_{10}$ is hydrogen or $CH_3$, and $R_{11}$ is alkyl having 1 to 26 carbon atoms; esters represented by the formula $CH_2=C(R_{10})COOR_{12}$ wherein $R_{10}$ is as defined above, $R_{12}$ is

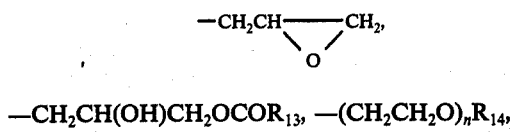

$-CH_2CH(OH)CH_2OCOR_{13}$, $-(CH_2CH_2O)_nR_{14}$,

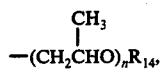

$-CH_2CH=CH_2$, $-CH_2CH(CH_3)OH$, $-CH_2CH_2CH_2OH$ or $-CH_2CH_2OCH_2CH=CH_2$, $R_{13}$ is hydrogen or alkyl having one to 25 carbon atoms, $R_{14}$ is alkyl having one to 8 carbon atoms, and $n$ is an integer of 1 to 8;

esters represented by the formula $CH_2=C(CH_3)COOR_{15}$ wherein $R_{15}$ is $-CH_2CH_2OH$;

diolefins represented by the formula $R_{16}CH=C(R_{17})CH=CH_2$ wherein $R_{16}$ is hydrogen or $CH_3$, and $R_{17}$ is hydrogen, $CH_3$ or Cl;

styrene, vinyltoluene, α-methylstyrene, methacrylonitrile, addition product of acrylic acid or methacrylic acid and Cardura-E (trade mark of glycidyl ester of synthetic tertiary carboxylic acid, Product of Shell Chemical Co., U.S.A., general formula:

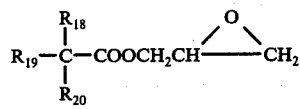

wherein $R_{18}$, $R_{19}$ and $R_{20}$ are alkyl and the total carbon number of them ranges between 7 and 9.), vinyl acetate and VeoVa monomers. These polymerizable vinyl monomers are used singly, or at least two of them are used conjointly. Furthermore, such vinyl monomer is used conjointly with up to 20%, preferably up to 10% by weight of water-soluble or hydrophilic vinyl monomer based on the weight of the former. Examples of the latter vinyl monomers are:

carboxylic acids represented by the formula $CH_2=C(R_{21})COOH$ wherein $R_{21}$ is hydrogen or $CH_3$;

carboxylic acid amides represented by the formula $CH_2=C(R_{21})CONHR_{22}$ wherein $R_{21}$ is as defined above, and $R_{22}$ is hydrogen, $-CH_2OH$ or $-CH_2OC_4H_9$;

compounds represented by the formula $CH_2=CHR_{23}$ wherein $R_{23}$ is CN or CHO;

N-methylacrylamide, N-ethylacrylamide, dimethylaminoethyl methacrylate, diethylaminoethyl methacrylate, hydroxyethyl acrylate, vinylpyridine, vinylpyrrolidone, etc.

The proportions of the emulsifier and the polymerizable vinyl monomer to be used in this invention are preferably such that the total solid content of the resulting emulsion has an acid value of about 3 to about 150, more preferably about 15 to about 50. The concentration of the solids in the emulsion composition is preferably about 15 to about 65% by weight.

The emulsion polymerization for preparing the emulsion compositions of this invention may be carried out by usual known methods. Generally the polymerization is conducted with stirring. After the monomer has been emulsified with stirring, the reaction system may be further processed in a stationary state. It is not always necessary to use a polymerization initiator, but such agent may be used in a usual manner to effect the polymerization promptly. Any of radical-producing initiators may be used for this purpose. Generally initiators of the peroxide type and azo type are useful.

The emulsions obtained according to this invention are used as coating compositions which are hardenable at room temperature. However they are also useful as coating compositions which are dried by baking. They are also usable for a wide variety of applications for example for processing resins. Even when singly used, the emulsions of this invention give coatings which are outstanding in resistance to water, corrosion and weather and in adhesiveness. They are also usable in admixture with other water-soluble resins to improve the properties of the resulting coatings.

This invention will be described below in greater detail with reference to Examples and Comparison Examples, in which the parts and percentages are all by weight unless otherwise specified.

PREPARATION EXAMPLE 1

A 1,641 g quantity of styrene-allyl alcohol copolymer (trade mark "RJ-101," product of Monsanto Chemical Co. having a number average molecular weight of 1,150 and 7.7% of OH content), 2,080 g of soybean oil fatty acid, 200 g of xylene and 3.3 g of dibutyltin oxide are placed in a 5-liter four-necked flask and reacted at 230° C for 10 hours while being dehydrated to obtain resin having an acid value of 5.47. To the resin is added 454 g of maleic anhydride, and the resin is maleinized at 190° to 200° C for 7 hours. The xylene and unreacted maleic anhydride are distilled off at reduced pressure, followed by ring cleavage with water. Ethylene glycol monobutyl ether is added to the resulting product to obtain a solution containing as solids 79.7% of resin A having a total acid value of 104 and half acid value of 96.

PREPARATION EXAMPLE 2

A 1,641 g quantity of styrene-allyl alcohol copolymer (trade mark "ASO-81," product of Daicel Ltd., Japan having a number average molecular weight of 1,140 and 7.44% of OH content), 1,905 g of linseed oil fatty acid, 183 g of xylene and 3.3 g of dibutyltin oxide are placed in a 5-liter four-necked flask and reacted at 230° C for 6 hours while being dehydrated to obtain resin having an acid value of 4.0. To the resin is added 433 g of maleic anhydride, and the resin is maleinized at 190° to 200° C for 4 hours. The xylene and unreacted maleic anhydride are distilled off at reduced pressure, followed by ring cleavage with water. Ethylene glycol monobutyl ether is added to the resulting product to obtain a solution containing as solids 79% of resin B having a total acid value of 96.

PREPARATION EXAMPLE 3

A 1,760 g quantity of xylene is placed into a 5-liter four-necked flask. To the xylene which is being stirred at 130° C are added dropwise over a period of 2 hours a mixture of 990 g of n-butyl methacrylate and 450 g of 2-hydroxyethyl methacrylate and a mixture of 400 g of xylene and 100 g of azobisdimethylvaleronitrile through separate dropping funnels respectively. One hour after the termination of dropwise addition, 20 g of azobisisobutyronitrile is added to the mixture, and the resulting mixture is thereafter maintained at 130° C for 3 hours. A 960 g quantity of linseed oil fatty acid and 4 g of dibutyltin oxide are added to the reaction mixture, and the mixture is subjected to esterification reaction at 230° C for 6 hours while being dehydrated to obtain resin having an acid value of 1.6. To the resin (600 g) is then added 250 g of maleic anhydride, and the mixture is reacted in a mixture of 300 g of cyclohexyl acetate and 200 of xylene at 170° to 180° C for 7 hours. After the reaction, the solvent and unreacted maleic anhydride are distilled off at reduced pressure, followed by ring cleavage with water. Ethylene glycol monobutyl ether is added to the resulting product to obtain a solution containing as solids 80% of resin C having a total acid value of 129.

PREPARATION EXAMPLE 4

A 45 g quantity of azobisdimethylvaleronitrile is dissolved in a mixture of 600 g of addition product of linseed oil fatty acid and glycidyl methacrylate and 300 g of n-butyl methacrylate. The mixture is added dropwise to 900 g of xylene at 120° C over a period of 2 hours for polymerization. A 10 g quantity of azobisisobutyronitrile is further added twice at an interval of one hour, and the mixture is left to stand at 120° C for 3 hours. A 100 g quantity of linseed oil fatty acid and 0.5 g of dibutyltin oxide are added to the mixture, and the resulting mixture is heated to 230° C while the xylene is being distilled off. The mixture is further heated for 6 hours while water is being distilled off. To the reaction mixture is added 150 g of glacial acetic acid, and the resulting mixture is heated at 200° C for 4 hours. The unreacted glacial acetic acid and xylene are thereafter removed at reduced pressure. A 400 g quantity of maleic anhydride is then added to the resulting mass, and 800 g of cyclohexyl acetate serving as a solvent is added to the mixture. The mixture is reacted at 170° to 180° C for 7 hours. The solvent and maleic anhydride are removed from the reaction mixture at reduced pressure, followed by ring cleavage with water. Ethylene glycol monobutyl ether is added to the product to obtain the product in the form of an ethylene glycol monobutyl ether solution containing as solids 80% of resin D having a total acid value of 120.

PREPARATION EXAMPLE 5

A 1,641 g quantity of styrene-allyl alcohol copolymer (trade mark "RJ-101," product of Monsanto Chemical Co. having a number average molecular weight of 1,150 and 7.7% of OH content), 2028 g of safflower oil fatty acid, 100 g of xylene and 1.5 g of dibutyltin oxide are placed in a 5-liter four-necked flask and reacted at 230° C for 6 hours while being dehydrated to obtain resin having an acid value of 2.0. To the resin is added 454 g of maleic anhydride, and the resin is maleinized at 190° to 200° C for 4 hours. The xylene and unreacted maleic anhydride are distilled off at reduced pressure, followed by ring cleavage with water. Ethylene glycol monobutyl ether is added to the resulting product to obtain a solution containing as solids 85.2% of resin E having a total acid value of 105 and half acid value of 87.

PREPARATION EXAMPLE 6

A 1,760 g quantity of xylene is placed into a 5-liter four-necked flask. To the xylene which is being stirred at 130° C are added dropwise over a period of 2 hours a mixture of 889 g of n-butyl methacrylate, 222 g of methyl methacrylate and 329 g of glycidyl acrylate and a mixture of 400 g of xylene and 100 g of azobisdimethylvaleronitrile through separate dropping funnels respectively. One hour after the termination of dropwise addition, 20 g of azobisisobutyronitrile is added to the mixture, and the resulting mixture is thereafter maintained at 130° C for 3 hours. A 1440 g quantity of safflower oil fatty acid, 1 g of sodium benzoate and 6 g of dibutyltin oxide are added to the reaction mixture, and the mixture is subjected to esterification reaction at 230° C for 8 hours while being dehydrated to obtain resin having an acid value of 7.0. To the resin is then added 337 g of maleic anhydride, and the mixture is reacted at 190° to 200° C for 7 hours. After the reaction, the solvent and unreacted maleic anhydride are distilled off at reduced pressure, followed by ring cleavage with water. Ethylene glycol monobutyl ether is added to the resulting product to obtain a solution containing as solids 80% of resin F having a total acid value of 105 and half acid value of 88.

EXAMPLE 1

A 200 g quantity of the solution of resin A obtained in Preparation Example 1 is neutralized with 0.95 equivalent of ammonia based on the carboxyl group of the resin and is then diluted with 769 g of water. A 16 g quantity of ethylene glycol monobutyl ether is added to the solution and thoroughly dissolved therein by full stirring. A 414 g quantity of n-butyl methacrylate is added to the resulting solution, and the mixture is thoroughly stirred to obtain a fully emulsified mass, to which a solution of one g of ammonium persulfate in 20 g of water is added. The mixture is reacted for 2 hours with stirring and heating at 80° C to obtain an emulsion. Table 1 shows the properties of the emulsion.

EXAMPLE 2

A 202 g quantity of the solution of resin B obtained in Preparation Example 2 is neutralized with 0.95 equivalent of ammonia based on the carboxyl group of the resin and is then diluted with 769 g of water. A 14 g quantity of ethylene glycol monobutyl ether is added to the solution and thoroughly dissolved therein. A 414 g quantity of n-butyl methacrylate is added to the resulting solution, and the mixture is thoroughly stirred to obtain a fully emulsified mass, to which a solution of one g of ammonium persulfate in 20 g of tap water is added. The mixture is reacted for 2 hours with stirring and heating at 80° C to obtain an emulsion. Table 1 shows the properties of the emulsion.

EXAMPLE 3

As emulsion is prepared in the same manner as in Example 2 except that 207 g of styrene and 207 g of 2-ethylhexyl methacrylate are used as polymerizable vinyl monomers. Table 1 shows the properties of the emulsion.

EXAMPLE 4

An emulsion is prepared in the same manner as in Example 1 except that 200 g of the solution of resin C obtained in Preparation Example 3 is used to subject 414 g of n-butyl methacrylate to emulsion polymerization. The properties of the emulsion is given in Table 1.

EXAMPLE 5

An emulsion is prepared in the same manner as in Example 1 except that 200 g of the solution of resin D obtained in Preparation Example 4 is used to subject 414 g of n-butyl methacrylate to emulsion polymerization. The properties of the emulsion is given in Table 1.

EXAMPLE 6

A 188 g quantity of the solution of resin obtained in Preparation Example 5 is neutralized with 0.95 equivalent of ammonia based on the carboxyl group of the resin and is then diluted with 769 g of water. A 28 g quantity of ethylene glycol monobutyl ether is added to the solution and thoroughly dissolved therein by full stirring. A 246 g quantity of styrene and 168 g quantity of 2-ethylhexyl acrylate are added to the resulting solution, and the mixture is thoroughly stirred to obtain a fully emulsified mass, to which a solution of one g of ammonium persulfate in 20 g of water is added. The mixture is reacted for 2 hours with stirring and heating at 80° C to obtain an emulsion. Table 1 shows the properties of the emulsion.

EXAMPLE 7

A 200 g quantity of the solution of resin F obtained in Preparation Example 6 is neutralized with 0.95 equivalent of ammonia based on the carboxyl group of the resin and is then diluted with 769 g of water. A 16 g quantity of ethylene glycol monobutyl ether is added to the solution and thoroughly dissolved therein. A 246 g quantity of styrene and 168 g quantity of 2-ethylhexyl acrylate are added to the resulting solution, and the mixture is thoroughly stirred to obtain a fully emulsified mass, to which a solution of one g of ammonium persulfate in 20 g of tap water is added. The mixture is reacted for 2 hours with stirring and heating at 80° C to obtain an emulsion. Table 1 shows the properties of the emulsion.

COMPARISON EXAMPLE 1

A 216 g quantity of ethylene glycol monobutyl ether solution containing as solids 74% of maleinized 1,2-vinyl type polybutadiene having a number average molecular weight of about 3,000 and an acid value of 100 is neutralized with 0.95 equivalent of ammonia based on the carboxyl group of the resin and is then diluted with 780 g of water. To the solution is added 414 g of n-butyl methacrylate, and the mixture is fully stirred to obtain an emulsion, to which a solution of one g of ammonium persulfate in 20 g of water is added. The mixture is heated at 80° C for 2 hours to obtain an emulsion, the properties of which are given in Table 1.

COMPARISON EXAMPLE 2

A 1,367 g quantity of stand linseed oil having a Gardner bubble viscosity of $Z-Z_1$ (20° C), 132 g of maleic anhydride and a small quantity of toluene are placed into a 2-liter four-necked flask, and the mixture is reacted at 200° C for 4 hours to obtain maleinized stand linseed oil having an acid value of 88. A 160 g portion of the oil is placed in a 2-liter four-necked flask and neutralized with an equivalent of ammonia water. A small quantity of ethylene glycol monobutyl ether is then added to the neutralized mass so that 3.8% of the resulting mixture is the ethylene glycol monobutyl ether. The mixture is thoroughly dissolved in 780 g of water, and 414 g of n-butyl methacrylate is added to the solution with full stirring for emulsification. A solution of one g of ammonium persulfate in 20 g water is added to the emulsified mass, and the mixture is heated at 80° C for 2 hours to obtain an emulsion. Table 1 shows the properties of the emulsion.

Each of the emulsion compositions obtained is applied by a bar coater to a polished mild steel panel to a film thickness of 25 to 30 μ, and the coating was tested for properties. Table 1 shows the results.

The properties of the emulsion, the properties of the coating and the amenability of the composition to brush coating are determined by the following methods.

(1) Tolerance:

The composition is placed into a glass container on newspaper. The tolerance is expressed in terms of the maximum thickness of the layer of the composition through which No. 12 types on the newspaper are legible.

(2) Polymerization degree:

The emulsion is dried in a vacuum dryer at 130° C for 2 hours, and the weight of the residue is measured to calculate the polymerization degree.

(3) Viscosity:

Water is removed from the emulsion, and the remaining mass is dissolved in ethylene glycol monobutyl ether. The viscosity of the solution (solid content: 15%) is measured at 25° C.

(4) Resistance to water:

The coating is immersed in water at 20° C for one day and is thereafter checked for changes.

(5) Resistance to salt spray:

According to JIS Z 2371. After testing for one day, the width of the resulting rust from the cut portion is measured.

(6) Pencil scratch hardness:

The coating is scratched with pencils ("Mitsubishi Uni-pencil," 6B to 9H in hardness). The result is given in terms of the pencil hardness one degree below the hardness at which scratches are formed on the coating.

(7) Adhesiveness:

One hundred squares, 1 mm × 1 mm, are formed by a knife in the coating by cross cutting, a cellophane tape is adhered to the cut coating and then peeled off quickly, and the number (n) of the squares remaining on the panel was counted. Adhesiveness is expressed by n/100.

(8) Gel fraction ratio:

Calculated from the difference in the weight of coating before and after the coating is extracted with tetrahydrofuran.

(9) Gloss retentivity:

Lead naphthenate and cobalt naphthenate are added in amounts of 0.45% and 0.05% respectively, calculated as the corresponding metals, to water-soluble acrylic resin (having an acid value of 85 and oil length of 27 calculated as fatty acid content and composed of styrene and n-butyl methacrylate) which dries at room temperature. Titanium dioxide is then dispersed in the mixture, and the dispersion is admixed, in an amount of 30 PHR (part per hundred resin) calculated as the acrylic resin, with the emulsion of this invention, the amount of the dispersed titanium dioxide being 80 PHR based on the total resin solids of the mixture finally prepared.

The resulting composition is applied to a coating of oil-based primer (JIS-K-5621) and the coated panel is tested for 250 hours on a weather-ometer of the sunshine type, and the another coated-panel is tested for 7 months on an outdoor-weather at Hiratsuka, Kanagawa-ken, Japan, and the coatings are thereafter checked for gloss retentivity.

(10) Amenability of composition to brush coating operation:

The same composition as mentioned in (9) is applied by a brush to a coating of emulsion of vinyl acetate homopolymer.

Table 1

| Properties of emulsion | Example 1 | 2 | 3 | 4 | 5 | 6 | 7 | Comp. Ex. 1 | 2 |
|---|---|---|---|---|---|---|---|---|---|
| Solid Solid content (%) | 39.8 | 39.9 | 39.8 | 39.7 | 39.9 | 39.9 | 39.9 | 39.7 | 38.8 |
| Viscosity (poises) (on B-type viscosimeter at 12 rpm and 20° C) | 0.075 | 2.80 | 2.10 | 21.7 | 10.0 | 3.1 | 1.5 | 0.14 | 3.0 |
| Particle size ($\mu$) | 0.26 | 0.15 | 0.20 | 0.48 | 0.35 | 0.16 | 0.43 | 0.17 | 0.40 |
| Tolerance 1) (mm) | 0.6 | 1.35 | 0.45 | 0.3 | 1.1 | 1.4 | 0.3 | 1.85 | 0.3 |
| Polymerization degree 2) (%) | 100 | 100 | 100 | 100 | 100 | 100 | 100 | 100 | 96 |
| Viscosity of emulsion as dissolved in ethylene glycol monobutyl ether 3) | D | J | F | D | F | J | F | Highly viscous, partially insoluble | A - B |

| Properties of coating after drying for 7 days | Example 1 | 2 | 3 | 4 | 5 | 6 | 7 | Comp. Ex. 1 | 2 |
|---|---|---|---|---|---|---|---|---|---|
| Resistance to water 4) | No change | No change | No change | No change | No change | No change | No change | No change | Slightly turned white |
| Resistance to salt spray 5) (mm) | 2.0 | 3.0 | 2.0 | 3.0 | 3.0 | 2.0 | 2.0 | 1.0 | 5.0 |
| Pencil scratch hardness 6) | B | B | B | B | B | B | B | F | B |
| Adhesiveness 7) 8) | 100/100 | 100/100 | 100/100 | 100/100 | 100/100 | 100/100 | 100/100 | 100/100 | 100/100 |
| Gel fraction ratio (%) | 30.0 | 50.7 | 28.0 | 28.5 | 31.0 | 35.0 | 28.0 | 87.2 | 11.0 |
| Weather-ometer gloss 9) retentivity (%) | 85 | 80 | 80 | 90 | 85 | 91 | 85 | 60 | 75 |
| Outdoor-Weather gloss 9) retentivity (%) | 85 | 82 | 81 | 90 | 80 | 90 | 80 | 58 | 70 |

| Amenability of composition to brush coating operation 10) | Example 1 | 2 | 3 | 4 | 5 | 6 | 7 | Comp. Ex. 1 | 2 |
|---|---|---|---|---|---|---|---|---|---|
| At high temp. and low humidity (30° C, 60 % R.H.) | Good | Good | Good | Good | Good | Good | Good | Dries too quickly, unacceptable | Good |
| At low temp. and high humidity (5° C, 80 % R.H.) | Good | Good | Good | Good | Good | Good | Good | Cracks occur | Acceptable |
| Under ordinary conditions | Good | Good | Good | Good | Good | Good | Good | Irregularities in coating* | Good |

*The composition is not smoothly applicable, producing irregularities in the coating.

What we claim is:

1. An emulsion composition prepared by the emulsion polymerization of a polymerizable vinyl monomer in the presence of an emulsifier in which the emulsifier is a neutralized addition polymerization polymer having as a side chain a maleinized, partially maleinized, fumarized or partially fumarized drying and/or semi-drying oil fatty acid residue linked to the main chain of the polymer by an ester bond, the emulsifier having an acid value of about 20 to about 350 prior to neutralization and being used in proportion to the vinyl monomer such that the total solid content of the resulting emulsion has an acid value of about 3 to about 150.

2. An emulsion composition as defined in claim 1 wherein the fatty acid constituting the side chain of the addition polymerization polymer is at least one acid selected from the group consisting of safflower oil fatty acid, soybean oil fatty acid, linseed oil fatty acid, hemp seed oil fatty acid, poppy seed oil fatty acid, sunflower oil fatty acid, walnut oil fatty acid, corn oil fatty acid, cotton seed oil fatty acid, mustard oil fatty acid, oiticica oil fatty acid, peanut oil fatty acid, perilla oil fatty acid, rubber-seed oil fatty acid, sesame oil fatty acid, tall oil fatty acid, tung oil fatty acid and dehydrated castor oil fatty acid.

3. An emulsion composition as defined in claim 1 wherein the main chain of the addition polymerization polymer is a homopolymer of a hydroxyl-or glycidyl-containing vinyl monomer.

4. An emulsion composition as defined in claim 3 wherein the hydroxyl-or glycidyl-containing vinyl monomer is at least one compound selected from the group consisting of allyl alcohol, esters represented by the formula $CH_2=C(R_1)COOR_2$ wherein $R_1$ is hydrogen or $CH_3$, and $R_2$ is $CH_2CH_2OH$, $CH_2CH_2CH_2OH$, $CH_2CH(OH)CH_3$,

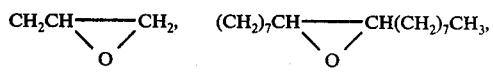

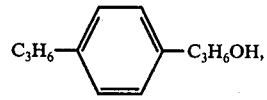

$(CH_2CH_2O)_nH$ or $(C_3H_6O)_nH$, and $n$ is an integer of 2 to 6.

5. An emulsion composition as defined in claim 1 wherein the main chain of the addition polymerization polymer is a copolymer of a hydroxyl- or glycidyl-containing vinyl monomer and a vinyl monomer not containing hydroxyl and glycidyl.

6. An emulsion composition as defined in claim 1 wherein the addition polymerization polymer is a homopolymer of an addition vinyl monomer of drying oil fatty acid and/or semi-drying oil fatty acid, and glycidyl methacrylate or glycidyl acrylate.

7. An emulsion composition as defined in claim 1 wherein the addition polymerization polymer is a copolymer of (1) an addition vinyl monomer of drying oil fatty acid and/or semi-drying oil fatty acid, and glycidyl methacrylate or glycidyl acrylate and (2) a vinyl monomer not containing hydroxyl and glycidyl.

8. An emulsion composition as defined in claim 5 wherein the vinyl monomer not containing hydroxyl and glycidyl is at least one compound selected from the group consisting of styrene, vinyltoluene, α-methylstyrene, acrylonitrile, methacrylonitrile, esters represented by the formula $CH_2 = C(R_3)COOR_4$ wherein $R_3$ is hydrogen or $CH_3$, $R_4$ is alkyl having one to 26 carbon atoms, $(CH_2CH_2O)_nR_5$ or

$(CH_2CHO)_nR_5$, $R_5$ is alkyl having one to 8 carbon atoms, and $n$ is an integer of 1 to 6, compounds represented by the formula $CH_2=CHR_6$ wherein $R_6$ is $OCOCH_3$ or Cl and VeoVa monomers.

9. An emulsion composition as defined in claim 5 wherein the copolymer contains at least 5% by weight of the hydroxyl- or glycidyl-containing vinyl monomer.

10. An emulsion composition as defined in claim 9 wherein the amount of hydroxyl- or glycidyl-containing vinyl monomer is at least 10% by weight.

11. An emulsion composition as defined in claim 1 wherein the addition polymerization polymer contains about 10 to about 90% by weight of drying oil fatty acid and/or semi-drying oil fatty acid.

12. An emulsion composition as defined in claim 1 wherein the acid value prior to neutralization is about 50 to about 150.

13. An emulsion composition as defined in claim 1 wherein the polymerizable vinyl monomer to be subjected to emulsion polymerization is at least one compound selected from the group consisting of:
esters represented by the formula $CH_2=C(R_{10})COOR_{11}$ wherein $R_{10}$ is hydrogen or $CH_3$, and $R_{11}$ is alkyl having 1 to 26 carbon atoms;
esters represented by the formula $CH_2=C(R_{10})COOR_{12}$ wherein $R_{10}$ is as defined above, $R_{12}$ is

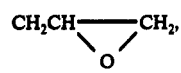

$CH_2CH(OH)CH_2OCOR_{13}$, $(CH_2CH_2O)_nR_{14}$,

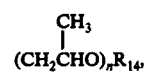

$CH_2CH=CH_2$, $CH_2CH_2CH_2OH$, $CH_2CH(CH_3)OH$ or $CH_2CH_2OCH_2CH=CH_2$, $R_{13}$ is hydrogen or alkyl having one to 25 carbon atoms, $R_{14}$ is alkyl having one to 8 carbon atoms, and $n$ is an integer of 1 to 8;
esters represented by the formula $CH_2=C(CH_3)COOR_{15}$ wherein $R_{15}$ is $CH_2CH_2OH$;
diolefins represented by the formula $R_{16}CH=C(R_{17})CH=CH_2$ wherein $R_{16}$ is hydrogen or $CH_3$, and $R_{17}$ is hydrogen, $CH_3$ or Cl;
styrene, vinyltoluene, α-methylstyrene, methacrylonitrile, addition product of acrylic acid or methacrylic acid and Cardura-E, vinyl acetate and VeoVa monomers.

14. An emulsion composition as defined in claim 13 wherein the polymerizable vinyl monomer is used conjointly with up to 20% by weight of water-soluble or hydrophilic vinyl monomer, the water-soluble or hydrophilic vinyl monomer being at least one compound selected from the group consisting of:
carboxylic acids represented by the formula $CH_2=C(R_{21})COOH$ wherein $R_{21}$ is hydrogen or $CH_3$;
carboxylic acid amides represented by the formula $CH_2=C(R_{21})CONHR_{22}$ wherein $R_{21}$ is as defined above, and $R_{22}$ is hydrogen, $CH_2OH$ or $CH_2OC_4H_9$;
compounds represented by the formula $CH_2=CHR_{23}$ wherein $R_{23}$ is CN or CHO;
N-methylacrylamide, N-ethylacrylamide, dimethylaminoethyl methacrylate, diethylaminoethyl methacrylate, hydroxyethyl acrylate, vinylpyridine and vinylpyrrolidone.

15. An emulsion composition as defined in claim 14 wherein the amount of water-soluble or hydrophilic vinyl monomer is up to 10% by weight.

16. An emulsion composition as defined in claim 1 wherein the acid value is about 15 to about 50.

17. An emulsion composition as defined in claim 1 wherein the concentration of the solids in the emulsion is about 15 to about 65% by weight.

* * * * *